US007966257B2

(12) United States Patent   (10) Patent No.: US 7,966,257 B2
DiGioacchino                 (45) Date of Patent:     Jun. 21, 2011

(54) REAL TIME ACCOUNT UPDATE

(75) Inventor: Laura DiGioacchino, San Mateo, CA (US)

(73) Assignee: Visa USA, Inc., Foster City, CA (US)

( * ) Notice: Subject to any disclaimer, the term of this patent is extended or adjusted under 35 U.S.C. 154(b) by 0 days.

(21) Appl. No.: 12/267,117

(22) Filed: Nov. 7, 2008

(65) Prior Publication Data

US 2009/0063346 A1   Mar. 5, 2009

Related U.S. Application Data

(62) Division of application No. 11/755,670, filed on May 30, 2007, now Pat. No. 7,904,389.

(51) Int. Cl.
*G06Q 40/00* (2006.01)
(52) U.S. Cl. .......................... 705/44; 705/40
(58) Field of Classification Search .............. 705/40, 705/44
See application file for complete search history.

(56) References Cited

U.S. PATENT DOCUMENTS

| | | | | |
|---|---|---|---|---|
| 3,727,186 | A * | 4/1973 | Stephenson et al. | 340/5.4 |
| 5,231,569 | A | 7/1993 | Myatt et al. | |
| 5,233,655 | A * | 8/1993 | Shapiro | 705/72 |
| 5,615,408 | A * | 3/1997 | Johnson et al. | 455/405 |
| 5,636,211 | A | 6/1997 | Newlin et al. | |
| 5,832,068 | A | 11/1998 | Smith | |
| 7,383,230 | B2 * | 6/2008 | Wolff | 705/53 |
| 7,620,592 | B2 * | 11/2009 | O'Mara et al. | 705/38 |
| 2003/0046235 | A1 | 3/2003 | Lacivita et al. | |
| 2003/0130919 | A1 * | 7/2003 | Templeton et al. | 705/35 |
| 2003/0195858 | A1 | 10/2003 | Watanabe et al. | |
| 2004/0117302 | A1 * | 6/2004 | Weichert et al. | 705/40 |
| 2004/0133516 | A1 | 7/2004 | Buchanan et al. | |
| 2005/0010524 | A1 | 1/2005 | Gutbrod et al. | |
| 2005/0075977 | A1 | 4/2005 | Carroll et al. | |
| 2005/0080717 | A1 * | 4/2005 | Belyi et al. | 705/38 |
| 2005/0080728 | A1 | 4/2005 | Sobek | |
| 2005/0087594 | A1 * | 4/2005 | Phillips et al. | 235/379 |
| 2005/0149455 | A1 | 7/2005 | Bruesewitz et al. | |
| 2005/0203842 | A1 | 9/2005 | Sanchez et al. | |
| 2005/0246181 | A1 | 11/2005 | Kawahara | |
| 2005/0261995 | A1 * | 11/2005 | Phelan | 705/31 |

(Continued)

OTHER PUBLICATIONS

U.S. Appl. No. 11/755,670, filed May 30, 2007, Office Action mailed Nov. 26, 2008.

(Continued)

*Primary Examiner* — Shahid R Merchant
*Assistant Examiner* — Mary Gregg
(74) *Attorney, Agent, or Firm* — Kilpatrick Townsend & Stockton LLP

(57) ABSTRACT

A method is used in a system that includes a financial service provider coordinating accounts issued by an issuer to cardholders requesting credit from merchants. The method can be performed by a merchant sending a transmission to its acquirer including a request for a transaction against one account to which the merchant receives a denial or prior to receiving such a denial. The merchant then requests information from the financial service provider who responds by sending the requested information, upon which the merchant determines whether to extend the credit. When the method is performed by a financial service provider, in response to the denial received by one merchant or prior to such denial, the financial service provider receives a transmission from the merchant including a request for information about the account. In response, the financial service provider sends the merchant the requested information.

20 Claims, 7 Drawing Sheets

U.S. PATENT DOCUMENTS

| | | | |
|---|---|---|---|
| 2005/0283436 A1* | 12/2005 | Greer et al. | 705/40 |
| 2005/0289198 A1 | 12/2005 | Todd | |
| 2006/0116954 A1 | 6/2006 | Strayer et al. | |
| 2006/0190734 A1* | 8/2006 | Spitz | 713/176 |
| 2006/0265602 A1* | 11/2006 | Robinson | 713/186 |
| 2007/0156553 A1 | 7/2007 | Zimmerman | |
| 2007/0165803 A1 | 7/2007 | Duan | |
| 2007/0198437 A1 | 8/2007 | Eisner et al. | |

OTHER PUBLICATIONS

U.S. Appl. No. 11/755,670, filed May 30, 2007, Response to Office Action filed Feb. 24, 2009.

U.S. Appl. No. 11/755,670, filed May 30, 2007, Final Office Action mailed May 1, 2009.

U.S. Appl. No. 11/755,670, filed May 30, 2007, Response to Final Office Action filed Sep. 1, 2009.

U.S. Appl. No. 11/755,670, filed May 30, 2007, Office Action mailed Dec. 1, 2009.

U.S. Appl. No. 12/267,117, filed Nov. 7, 2008, Office Action mailed Jul. 14, 2009.

U.S. Appl. No. 12/267,117, filed Nov. 7, 2008, Response to Office Action filed Oct. 14, 2009.

U.S. Appl. No. 12/267,117, filed Nov. 7, 2008, Final Office Action mailed Jan. 6, 2010.

U.S. Appl. No. 12/267,237, filed Nov. 7, 2008, Office Action mailed Oct. 26, 2009.

U.S. Appl. No. 12/267,237, filed Nov. 7, 2008, Response to Office Action filed Jan. 26, 2010.

U.S. Appl. No. 12/267,237, filed Nov. 7, 2008, Office Action mailed Apr. 26, 2010.

"TeleCheck to Provide Check Verification to Limited Brands," PR Newswire, Jan. 13, 2003, © 2010 PR Newswire Association Inc.

"STIC Search Report CIC 3600," Aug. 4, 2010.

"Faster Card Transactions Brought to You by FM Radio," ABA Banking Journal, Jul. 1988, vol. No. 80, pp. 20, 22.

"A Lift for Recurring Payments?," Frederick H. Lowe, Credit Card Management, vol. 16, pp. 30-34, Aug. 2003.

* cited by examiner

REAL TIME ACCOUNT UPDATE

CROSS-REFERENCE TO RELATED APPLICATIONS

This is a divisional application of U.S. patent application Ser. No. 11/755,670, Real Time Account Update", filed on May 30, 2007, which is incorporated herein by reference.

FIELD

The present invention relates generally to financial transactions, particularly to customers requesting transactions with merchants, and more particularly to techniques for merchants to investigate and update an account status of a customer incident to a financial transaction, where the financial transaction can be conducted with an electronic payment vehicle, including, but not in any way of limited to, a credit card, an ATM card, a debit card, a money order, a gift card, a wire transfer order, a travelers cheque, or combinations of the above.

BACKGROUND

Transactions, including credit card transactions, are used for a great number of purchases and sales between merchants and cardholders. A normal card transaction, however, involves a number of parties, including an account holder who possesses a card, a merchant, an acquirer, an issuer and a transaction handler. By way of example, and not by way of limitation, a well known transaction handler is the VISA™ card association. The acquirer is a business entity, e.g., a commercial bank, that has a business relationship with the merchant and receives some or all of the transactions from that merchant. The issuer is a business entity which issues the card to the cardholder. The card association typically has a network of processing applications which facilitates issuance of cards and processing of card transactions. By way of example, and not by way of limitation, the VISA™ card association provides the VisaNet™ network services. The VisaNet™ network services provide computer systems to process transactions in a reliable and secure manner.

In a transaction, a card representing the account of an account holder is tendered to a merchant. The merchant, acquirer, issuer and transaction handler cooperatively determine whether to authorize the account holder's requested transaction. Sometimes, the authorization for the transaction is not received by the merchant. It would be an advance in the art to provide one or more techniques that permit a merchant to extend credit to the account of an account holder after the merchant receives a denial for authorization from an acquirer, where the one or more techniques include allowing the merchant to ascertain recent information upon demand about the cardholder's account. The merchant's inquiry into a cardholder's account information may provide information sufficient to permit the merchant to enter into the transaction using the account of the cardholder that otherwise would have resulted in a refusal of the transaction and a lost transaction to a loyal, high volume customer.

SUMMARY

Methods are used in one or more systems that each includes a transaction handler, such as a financial service provider, to coordinate accounts that are issued by an issuer to cardholders requesting transactions with merchants. Each merchant has an acquirer with whom the transaction handler also coordinates the accounts. The method can be performed by a merchant sending a transmission to its acquirer including a request for a transaction against an account(s) to which the merchant receives a denial. The method can also be performed by a merchant sending a transmission to its acquirer including a request for a transaction against one account where the merchant has not received a denial but rather where the merchant wishes to determine—in advance—whether there might be a denial should a transaction be attempted by the card holder. The merchant then requests information from the transaction handler who responds by sending the requested information, upon which the merchant resubmits the transaction for authorization using the requested information about the transaction. When the method is performed by a transaction handler, whether or not it is performed in response to the denial received by one merchant, the transaction handler receives a transmission from the merchant including a request for information about the account of the transaction. In response, the transaction handler sends the merchant the requested information.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

The subject invention will be described in the context of the appended drawing figures, where the same numbers are used throughout the disclosure and figures to reference like components and features.

DETAILED DESCRIPTION

Figure 1:
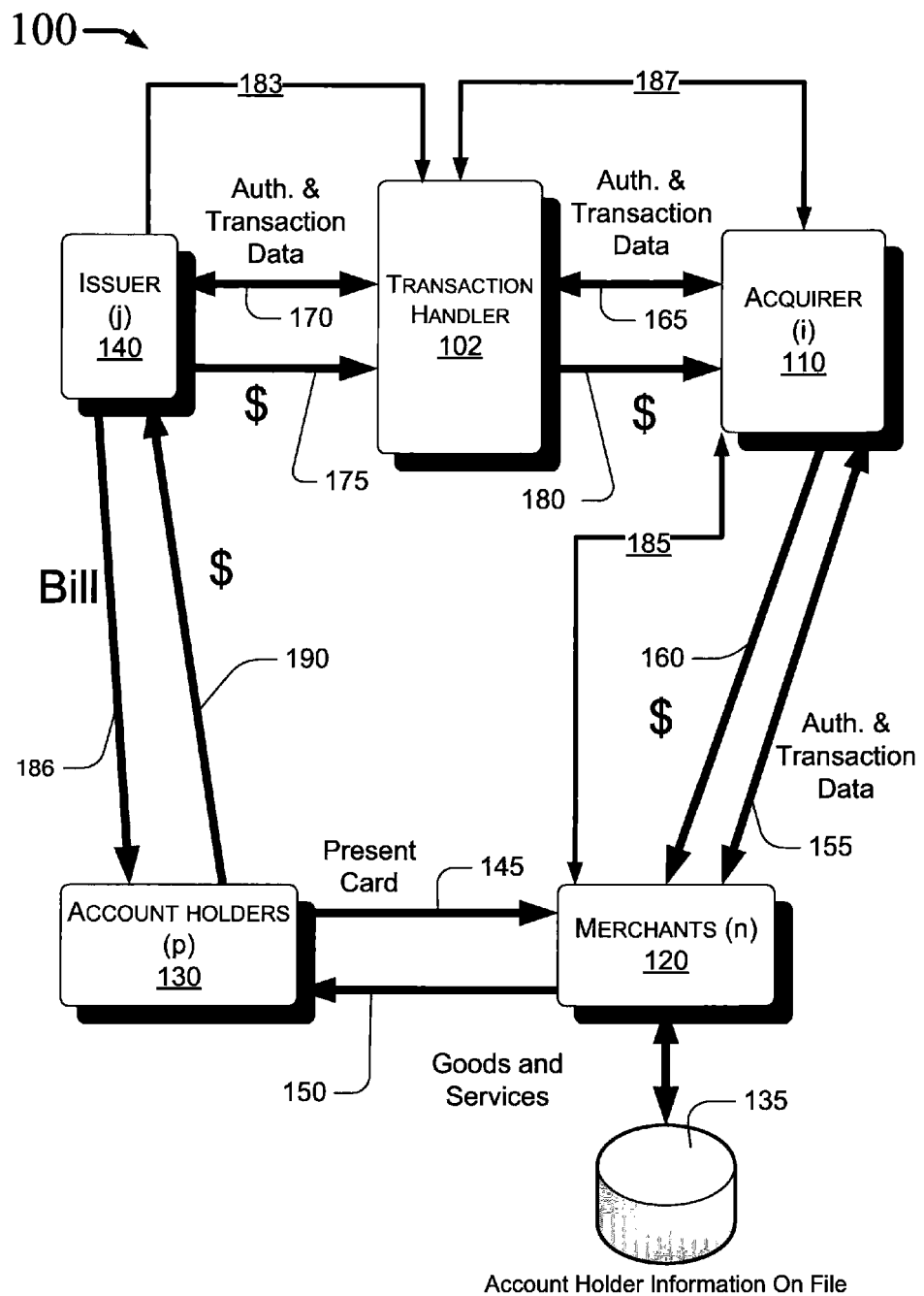
FIG. 1 depicts in a diagram the provision of the financial service of authorizing and remunerating electronic payment vehicle transactions (i.e.; credit card transactions)

In general, a transaction includes participation of a transaction handler, a user, such as an account holder or a cardholder, a merchant, an acquirer, and an issuer. Typically, an account holder presents an account identifier, such as a number on a card, to a merchant in connection with a transaction. A transaction can involve purchasing goods or services or the redemption of loyalty incentives. The issuer may authorize the transaction amount using the transaction handler. The transaction handler may also clear the transaction. Authorization includes the issuer, or the transaction handler on behalf of the issuer, authorizing the transaction amount in connection with the issuer's instructions such as through the use of business rules. The business rules could include instructions or guidelines from the transaction handler, account holder, merchant, acquirer, issuer, or financial institution or combination thereof. The transaction handler may maintain a log of authorized transactions. Once approved, the merchant will record the authorization, allowing the account holder to receive the good or service.

The merchant may, at discrete periods, such as the end of the day, submit a list of authorized transactions to the acquirer or transaction handler. The transaction handler may compare the submitted authorized transaction list with its own log of authorized transactions. If a match is found, the transaction handler may route authorization transaction amount requests from the corresponding acquirers to the corresponding issuers involved in each transaction. Once the acquirer receives the payment of the authorized transaction amount from the issuer, it can forward the payment to the merchant less any transaction costs, such as fees. If the transaction involves a debit or pre-paid card, the acquirer may choose not to wait for the initial payment prior to paying the merchant.

There may be intermittent steps in this process some of which may occur simultaneously. For example, the acquirer can initiate the clearing and settling process, which can result in payment to the acquirer for the amount of the transaction. The acquirer may request from the transaction handler that the transaction be cleared and settled. Clearing includes the exchange of financial information between the issuer and the acquirer and settlement includes the exchange of funds. The transaction handler can provide services in connection with settlement of the transaction. The settlement of a transaction includes depositing an amount of the transaction settlement from a settlement house, such as a settlement bank, that the transaction handler typically chooses, into a clearinghouse, such as a clearing bank, that the acquirer typically chooses. The issuer deposits the same from a clearinghouse, such as a clearing bank, that the issuer typically chooses into the settlement house. Thus, a typical transaction involves various entities to request, authorize, and fulfill processing the transaction.

To give a more specific example of the foregoing general transaction scenario, FIG. 1 is a diagram depicting an implementation 100 of a particular financial transaction system. By way of nomenclature, drawing elements 120, 130, 140 in FIG. 1 are illustrated with a single box, but indicate one or more elements as the indicated subscripts apply. For example, Issuer (j) 140 is one of a possible plurality of issuers, where j may range from 1 to an unlimited number.

Account holder 130 presents an electronic payment vehicle (i.e.; a credit card) to a Merchant 120 (at step 145) as tender for a financial transaction such as a purchase of goods. Those of skill in the art will recognize that other financial transactions and instruments other than credit cards may also be used, including, but not in any way of limited to, ATM cards, debit cards, money orders, gift cards, wire transfer orders, travelers cheques, or combinations of the above. For purposes of illustration and explanation, however, reference will be made to a credit card.

As part of the transaction, the Account holder's 130 credit card is typically scanned or swiped through a magnetic card reader by the Merchant 120, whereupon account information is read from the card and a request for authorization is transmitted to the Merchant's Acquirer (i) 110 (at step 155). Each acquirer (i) is a financial organization that processes credit card transactions for businesses, for example merchants, and is licensed as a member of a transaction handler such as a credit card association. As such, acquirers establish a financial relationship with their merchants, and assist in preventing and reporting fraudulent transactions and security-related events.

The Acquirer (i) 110 transmits the account information to the transaction handler TH 102 (at step 165), who in turn routes the request to the Account holder's issuing bank, or Issuer 140 (at step 170). The Issuer 140 returns authorization information to the TH 102 (at step 170) who returns the information to the Merchant 120 through the Acquirer (i) 110. The Merchant, 120, now knowing whether the Issuer's 140 credit card account is valid and supports sufficient balance, may complete the transaction and the Account holder 130 in turn receives goods and/or services in exchange (at step 150). Most credit card associations instruct merchants that after receiving authorization, the detailed credit card account information obtained from the point of sale magnetic stripe scanner must be deleted.

To reconcile the financial transactions and provide for remuneration, information about the transaction is provided by the Merchant 120 to Acquirer (i) 110 (at step 155), who in turn routes the transaction data to the TH 102 (at step 165) who then provides the transaction data to the appropriate Issuer 140 (at step 170). The Issuer then provides funding for the transaction to the TH 102 (at step 175) through a settlement bank (not shown). The funds are then forwarded to the Merchant's Acquirer 110 (at step 180) who in turn pays the Merchant 120 for the transaction (at step 160), (less a merchant discount, if applicable). The Issuer 140, then bills the Account holder 130 (at step 186), and the Account holder 130 pays the Issuer 140 (at step 190), with possible interest or fees.

Merchant 120 may have an on going relationship with one or more Account holders 130. This relationship may include storing account information in a transactions data database, such as data storage for each of the Merchant's Account holders 130 in an 'Account Holder Information On File' database 135. By way of example, and not by way of limitation, a customer may have their credit card account number and expiration date on file in database 135, where Merchant 120 is a health club that makes automatic health club monthly membership charges to the customer's account, or where Merchant 120 is an automobile rental service that sporadically receives a reservation request for an automobile from the customer which reservation is held by the customer's credit card information stored in database 135.

Over time, the information in database 135 may decrease in accuracy. As such, Merchant 120 may need to periodically have this information updated, an example of which is seen by reference numerals 185 and 187 in FIG. 1. To do so, Merchant 120 executes batch operation 185 to send all or a portion of database 135 to the Merchant's Acquirer 110. The Merchant's Acquirer 110 then requests a batch update 187 to database 135 from the TH 102 who receives sporadic and/or periodic updates 185 to accounts for account holders 130 from respective issuers 140. TH 102 may run each account in database 135 in a batch operation against its account records to determine which accounts, if any, have changed. By way of example, the type of changes that may have occurred is that an account that expired has been renewed with a new expiration date. Alternatively, the account may have been closed.

For an example of the foregoing, the VisaNet™ credit network services include a product which provides account information updates from issuers and provides these updates to participating merchants who inquire about their customer's future transactions for which customer account information is kept on file by the merchant, for instance cards on file type customers. This service and exchange of information occurs in batch processes.

After all changes to accounts in database 135 have been identified, the batch update data is sent by TH 102 to the Merchant's Acquirer 110 in the batch operation 187. The Merchant's Acquirer 110 passes the batch updated account data in the batch operation 185 to the requesting Merchant 120. The requesting Merchant 120 can then perform a batch update 180 to the database 135 with the updates received from the Merchant's Acquirer 110.

A problem occurs when Merchant 120 attempts to, but does not, receive authorization from the Merchant's Acquirer 110 to extend credit for a purchase transaction to an Account holder 130 whose account information is stored in the Account Holder Information On File database 135. Such a denial may be due to outdated account information in database 135 that does not match account information that the Merchant 120 has and the Issuer 140 has regarding the same account.

The above FIG. 1 described implementation 100 involving a transaction system with parties that include an account holder, a merchant, an issuer, an acquirer, and a transactional hander, other implementations of a more specific nature are also contemplated, particularly a commercial transaction, and more particularly a credit card transaction. Moreover, those of skill in the art also recognize that other financial transactions and instruments may also be used, including, but not in any way of limited to, ATM cards, debit cards, money orders, gift cards, wire transfer orders, travelers cheques, or combinations of the above.

In one implementation, a first method is disclosed. The method can be used in a system for conducting a commercial transaction between an account holder and a merchant. The system includes a financial service provider coordinating accounts issued by an issuer to cardholders each making requests for credit on the corresponding account to merchants. Each merchant has an acquirer with whom the financial service provider also coordinates the accounts of the cardholders making the requests for credit.

The disclosed first method can be performed, in yet another implementation, by one merchant by forming a transmission destined for the merchant's acquirer including a request for a financial transaction against one such account. The merchant receives a transmission from the merchant's acquirer. This transmission may or may not include a decline of the request for credit for the account in response to the request for credit for the account. In fact, the transmission may have been received prior to a decline being received for the transaction.

Where the transmission includes a decline of the request for credit for the account in response to the request for credit for the account, in response to the received decline, the merchant forms a transmission destined for the financial service provider corresponding to the account and including a request for information about the account. The merchant receives a transmission from the financial service provider including the requested information about the account. In response to receiving the changes to the account, the merchant can query the received changes to the account against a predetermined criterion to determine whether to extend the credit in response to the request for the financial credit transaction against the account. Alternatively, the merchant can resubmit a request to authorization using the requested information regarding the received changes to the account to see if it will be authorized.

In yet another exemplary implementation, the disclosed first method can be performed by the financial service provider. When so performed, in response to the denial received by one merchant, the financial service provider receives a transmission from the merchant including a request for information about the one such account. In response to the request for information about the account from the merchant, the financial service provider forms a transmission destined for the merchant including the requested information about the one such account.

In another implementation, a second method is disclosed. The second method is performed in a system with a financial service provider coordinating accounts issued by an issuer to cardholders each making requests for credit on the corresponding account to merchants. Each merchant has an acquirer with whom the financial service provider also coordinates the accounts of the cardholders making the requests for credit.

In yet another implementation, a merchant performs the second method by forming a transmission destined for the merchant's acquirer requesting a batch comparison of a plurality of accounts for financial credit transactions to determine any changes thereto. In response to the request for the batch comparison, the merchant receives a transmission from the merchant's acquirer including the requested changes respectively to each of the accounts. The merchant batch updates the plurality of accounts with the respective received changes thereto. A transmission is formed by the merchant that is destined for the merchant's acquirer and contains a request for a financial credit transaction against one such account. Alternatively, the merchant can send the transmission prior to a decline and simply for the purpose of getting updates to an account so as to avoid a future decline. For example, the update may be a new expiry date, a new credit limit, a name change, etc.

In the case where the merchant receives a transmission from the merchant's acquirer that includes a denial of the request for credit for the one such account in response to the request for credit for the account, the merchant can make a response to the decline. In response to the received decline, the merchant can form a transmission destined for the financial service provider and including a request for the content of the changes to the one such account since the last batch update to the account. The merchant receives a transmission from the financial service provider including the changes to the one such account since the last batch update to the account. In response to receiving the changes to the one such account since the last batch update to the one such account, the merchant can query the received changes to the account against a predetermined criterion to determine whether to extend the credit in response to the request for the financial credit transaction against the one such account.

Another implementation is disclosed in a third method. The third disclosed method can be performed in a system of accounts held by cardholders, where issuers issue respective such accounts to the cardholders, merchants receive requests to extend credit upon the accounts for transactions by the cardholders, acquirers receive from the merchants requests for authorization of transactions for credit, acquirers communicate with the corresponding issuers to determine whether to authorize or deny each such requested transaction for credit for the accounts respective such cardholders, where a financial service provider coordinates each such account for each such cardholder with the issuers, the merchants, and with the merchant's acquirers, and wherein the financial service provider receives updated account information from the issuers about the respective cardholders to which the issuers issued respective such accounts.

The third disclosed method can be performed by a financial service provider who received updated account information from one such issuer for one such account of one such cardholder. The financial service provider also receives a transmission from one such merchant including a request for account information about the one such cardholder who is requesting credit upon the cardholder's account from the one such merchant. The financial service provider sends a transmission destined from the one such merchant and including the requested updated account information received from the one such issuer.

The third disclosed method can be performed by the at one such merchant who forms a transmission destined for the financial service provider and contains a request for updated information for a single transaction for a single account. The one such merchant receives a transmission from the financial service provider that contains the requested account information with respect to the one such account.

For each merchant and financial service provider of the first, second, and third disclosed method, still further implementations provide apparatus, hardware, software, control logic, and other means for each manipulative step and function described above.

FIGS. 2-7 depict various representation of a specific type of commercial transaction, namely a credit card transaction. This commercial transaction system will be described in regards to FIGS. 2-7 for credit card transactions that include the parties of an account holder as a cardholder, a merchant, an issuer, an acquirer, and a transactional hander as a financial service provider. It is contemplated, however, that other implementations of a more specific nature are also applicable to the invention. Moreover, those of skill in the art also recognize that other financial transactions and instruments may also be applicable, including, but not in any way of limited to, ATM cards, debit cards, money orders, gift cards, wire transfer orders, travelers cheques, or combinations of the above. Indices (i), (j), (n), and (p) seen in the FIGS. indicate a possible plurality of such entities, where each indexes may range from zero (0) to infinity.

Figure 2:
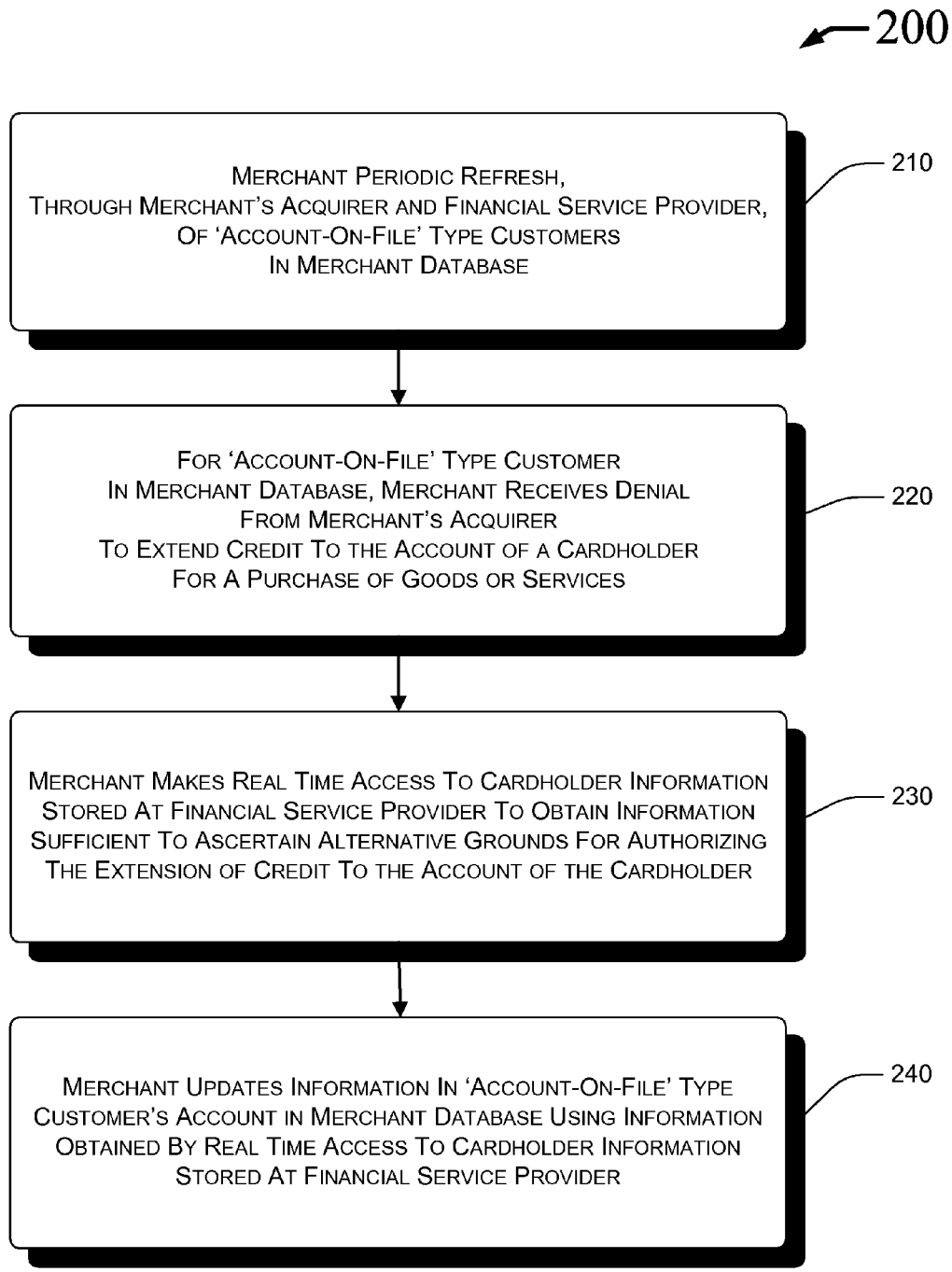
FIGS. 2-3 illustrate in related exemplary process and system diagrams, respectively, one implementation to provide the financial service of authorizing electronic payment vehicle transactions (i.e.; credit card transactions)
Figure 3:
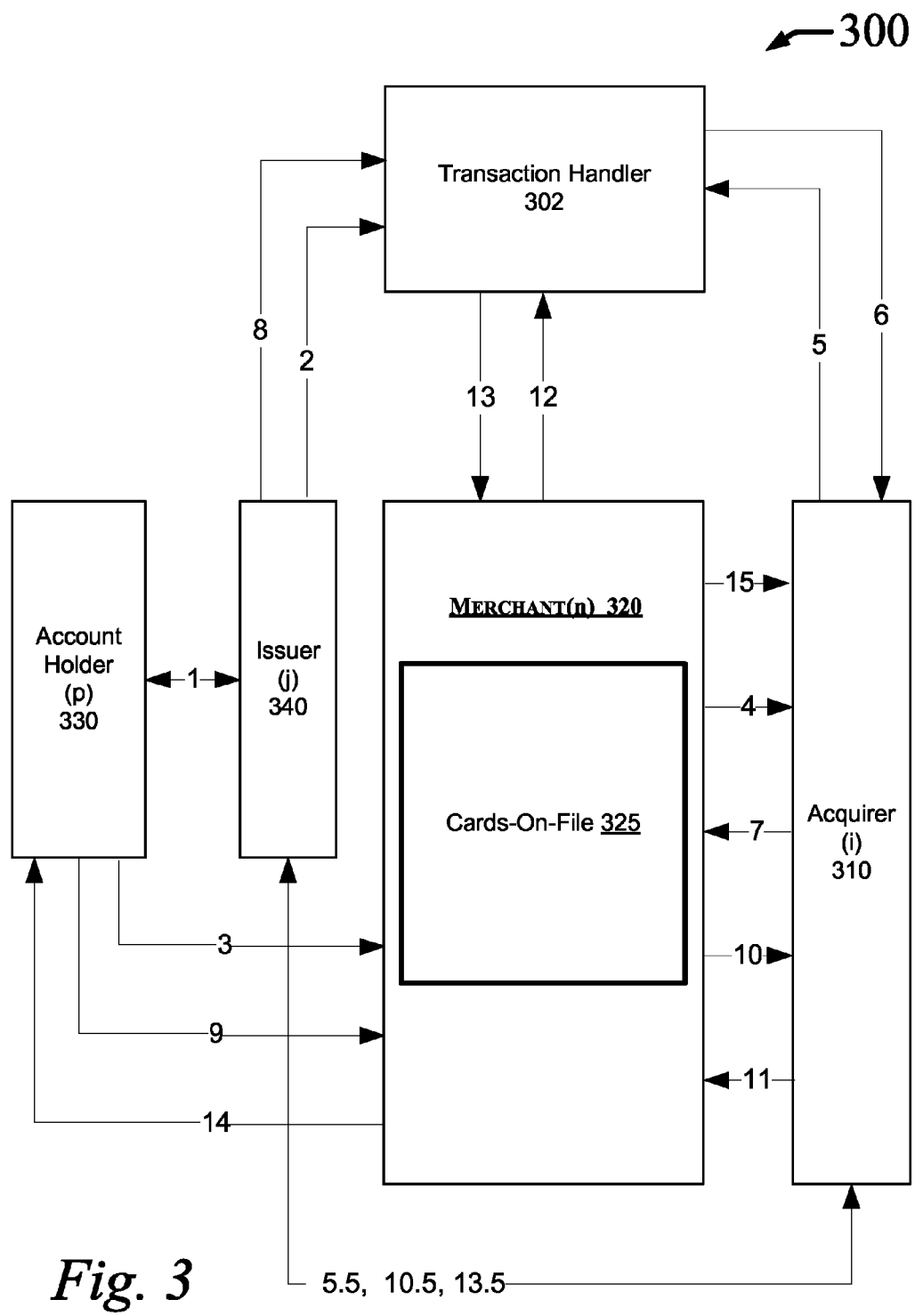

FIG. 2 illustrates, in accordance with the teachings of the present invention, one implementation, a process 200 to provide the financial service of authorizing credit card transactions. FIG. 3 is a system 300 in which the depicted manipulative steps of process 200 in FIG. 2 can be operational.

Process 200 begins at step 210 at which a merchant can periodically refresh the information stored by the merchant about the credit accounts of the merchant's account holders or customers. This refresh can be requested by the merchant through the merchant's acquirer who in turn retrieves the updated information from the financial service provider for forwarding the updated information to the requesting merchant. Once received the merchant can then update the information it stores about its account holders' accounts.

Process 200 moves from step 210 to step 220 at which a merchant investigates the possibility of extending credit to an account holder's account for a present or future financial transaction, where the account holder's account information is kept by the merchant. The merchant receives a denial of authorization to extend the credit to the account holder's account that the merchant is investigating. The denial of authorization was received from the merchant's acquirer.

Process 200 moves from step 220 to step 230 at which the merchant accesses information for the account of the account holder, in real time, that is kept by the financial service provider. The information obtained in real time from the financial service provider is sufficient to allow the merchant to make the decision to authorize the extension of credit upon the account of the account holder. The merchant can be provided with such real time access automatically upon such denial of the authorization to extend credit such that the merchant's computing systems makes an automatic, secure, and privacy complying real time access to the financial service provider's computing systems, for instance the merchant's server being provided with real time access to the transaction handler's server. This real time access provides the merchant with recent information about the account holder's account, where that recent information may not have been available from the acquirer, such as where the recent information had only recently been obtained by the transaction handler or financial services provider or financial services provider from the issuer regarding recent changes to the account holder's account Alternatively, the merchant can be provided with such real time access upon such denial of authorization through an interactive user interface. The merchant operates the user interface, such as through a browser based input/output screen for the World Wide Web, to make an authenticated, access controlled, secure, and privacy compliant real time access to the financial service provider's computing systems, for instance the merchant's client being provided with real time access to the transaction handler's server. The information obtained in real time on the World Wide Web from the financial service provider will preferably be sufficient to allow the merchant to make the decision to authorize the extension of credit upon the account of the account holder. The merchant can be provided with such real time access automatically upon such denial of the authorization to extend credit. This real time access provides the merchant with recent information about the account holder's account, where that recent information may not have been available from the acquirer, such as where the recent information had only recently been obtained by the transaction handler or financial services provider from the issuer regarding recent changes to the account holder's account.

By way of example of step 230, the merchant might be an online bookseller who typically keeps account information current via direct communication with the account holder. However, in specific situations, a valued account holder of the online book seller may not have updated new information about the account holder's account into the records that are stored by the book seller. For example, the book seller might receive a large order from the account holder with expedited shipping. The book seller initiates the authorization process to extend credit to the account holder's account for which a denial from the merchant's acquirer is received. In response, the online book seller obtains real time access to the financial service provider's information about the account holder's account. In so doing, the online book seller locates the discrepancy in the account holder's account information between the local records for the account holder and the real time records kept by the financial service provider.

Examples of the types of discrepancies in the account holder's account information that might result in a denial of authorization (i.e.; a decline) include a referral of the transaction to the issuer, an indication that the card is lost or stolen, an invalid account number, an expired cards, etc. In the case of expired cards, the real time account update information described herein is particularly helpful to the merchant in avoiding transactions that will be declined due to an expired card date.

The online book seller determines that the discrepancy is insignificant relative to exposing the online book seller to a credit risk on the part of the valued account holder and decides to authorize the extension of credit as well as the extra cost to satisfy the valued account holder's request for expedited shipping. In this instance, the bookseller's motivation is to provide superior service to the account holder, and the real-time account update service provided by the financial service provider was the vehicle available to the merchant for obtaining the information needed to ascertain the source of the discrepancy so as to allow an authorization of the extension of credit to the account of the valued account holder.

Referring again to FIG. 2, process 200 moves from step 230 to step 240 at which the merchant uses the data obtained in real time from the financial service provider to update the information kept by the merchant for the account of the account holder.

FIG. 3 illustrates a system 300 in which process 200 can be operational. System 300 includes a transaction handler 302 coordinating credit accounts with each issuer (j) 340 that issues each credit account to an account holder (p) 330. Each merchant (n) 320 can accept the credit card of the account holder (p) 330 for the purchase and sales of goods and services in a credit transaction using the account of the account holder (p) 330. Each merchant (n) 320 can also store account information about the credit cards of the cardholders 330 in a cards-on-file storage 325. For the purchase and sales of goods and services in a credit transaction using the account of the account holder (p) 330, merchant (n) 320 initiates an authorization the account with the merchant's acquirer (i) 310 who engages in a related communication with the issuer (j) 340 of the account of the account holder (p) 330. Upon authorization of the credit transaction, the merchant (n) 320 completes the purchase and sales of goods and services with account holder (p) 340.

Each merchant (n) 320 can request the execution of a batch process that determines changes that have been made to accounts kept in cards-on-file 325. Work flows 4-7 can be seen to represent a batch process initiated by the merchant (n) 320 to make a request to the merchant's acquirer (i) 310 to determine changes to the cards-on-file 325. The merchant's acquirer (i) 310 passes the request at work flow 5 to the transaction handler 302. Note, however, that cards-on-file 325 need not enable the functionality of work flows 4-7 to accommodate the same as these are optional features left to the entity that assembles or otherwise integrates the various components of system 300.

System 300 includes at least a plurality of accounts held by account holders (p) 330 in which each issuer (j) 340 issues respective accounts to the account holders (p) 330. Merchants (n) 320 each receives a request to extend credit upon an account for a transaction by an account holder (p) 330. Each acquirer (i) 310 receives from the merchant (n) 320 a request for authorization of the transaction for credit. This request may be granted or denied after the acquirer (i) 310 communicates with the corresponding issuer (i) 340. The transaction handler 302 coordinates each account for each account holder (p) 320 with the issuers 340 and the acquirers 310. The transaction handler 302 periodically received updated account information from each respective issuer (j) 340 regarding its account holders (p) 330.

System 300 illustrates work flows 1 through 15. Work flow 1 represents the issuance of a credit account to an account holder (p) 330 by an issuer (j) 340. Work flow 2 represents the communication of information about the issued account to the transaction handler 302. At work flow 3, the account holder (p) 330 provides information to a merchant (n) 320 for storage in a cards-on-file 325 incident to a request for a credit transaction for the purchase and sales of goods and services. Work flows 4-7 represent an authorization cycle initiated by the merchant (n) 320 for the credit transaction requested by the account holder (p) 330.

The requested credit transaction for which the authorization is being sought might be for a present transaction, or for a future transaction. By way of example, a future transaction might be one or more travel booking reservations being planned, such as a reservation with a car rental company, a cruise line merchant, or a lodging merchant.

The request to authorize credit on the account may be granted or it may be denied through the process of communicating information about the account holder (p) 330 as stored in cards-on-file 325 to the acquirer (i) 301, the transaction handler 302 and the corresponding issuer (j) 340 in work flows 4 through 7.

Work flow 8 represents a communication from the issuer (j) 340 to the transaction handler 302 that something has changed on the account of the account holder (p) 330. This change is not communicated to the merchant (n) 320 for storage in the cards-on-file 325. Subsequently, account holder (p) 330 requests a credit transaction with the merchant (n) 320 as shown by work flow 9. The request is followed by work flows 10 and 11 for the authorization of credit on the account. Due to the discrepancy in the information changed at work flow 8 with the information about the account holder (p) 330 that is stored in and communicated from cards-on-file 325 by merchant (n) 320, the request for the authorization to extend credit is denied at work flow 11.

In response, work flow 12 illustrates the merchant (n) 320 making a demand real time access to the transaction handler 302 to learn the source of the discrepancy in the account information. Work flow 13 represent the communication back to the merchant (n) 320 of the needed information given by issuer (j) 340 at work flow 8 to the transaction handler 302.

Upon seeing the discrepancy, merchant (n) 320 completes the financial transaction with account holder (p) 330 at work flow 14 and communicates same as shown by work flows 13.5 and 15 with the corresponding issuer (p) 330 and with the merchant (n) 320's acquirer (i) 310.

Examples of discrepancies that can be resolved by giving the merchant real time access to account information for account holders where an account number has been changed and the merchant gets a decline on the old account number. The merchant can go online to get the changed information in real time. The member can go to an Internet Website system, put in the old account number and receive back the new account number. The new account number can then be used. Alternatively, prior to the merchant receiving a decline, and out of an abundance of caution to avoid receiving a decline, the merchant can go online in real time to find out if any information about the account has changed information. Again, the member can go to an Internet Website system for such changed information, put in the old account number and receive back information about the new, changed account number. The new account number can then be used so that a decline will not be received. This same example also will apply to the situation where a new expiry date has been given to the account, and the merchant needs the new expiry information after a decline or prior to asking for an authorization and in order to avoid receiving a decline.

Accordingly, the real time information learned by the merchant (n) 320 allowed the extension of credit to the account of the account holder (p) 330, improved upon account holder service, and resulted in increased sales for the merchant (n) 320 that would have otherwise been lost.

Figure 4:
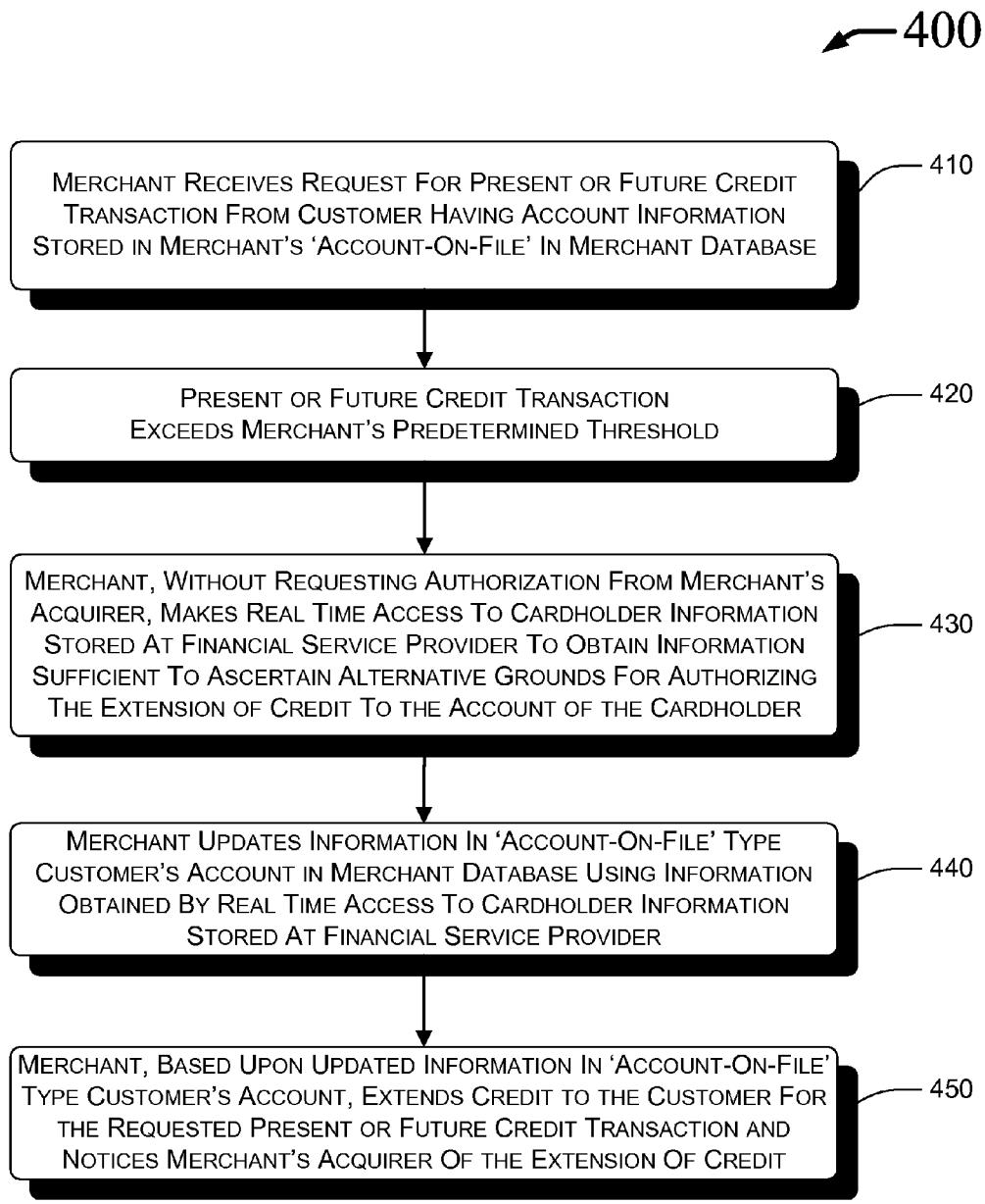
FIGS. 4-5 illustrate in related exemplary process and system diagrams, respectively, another implementation to provide the financial service of authorizing electronic payment vehicle transactions (i.e.; credit card transactions)
Figure 5:
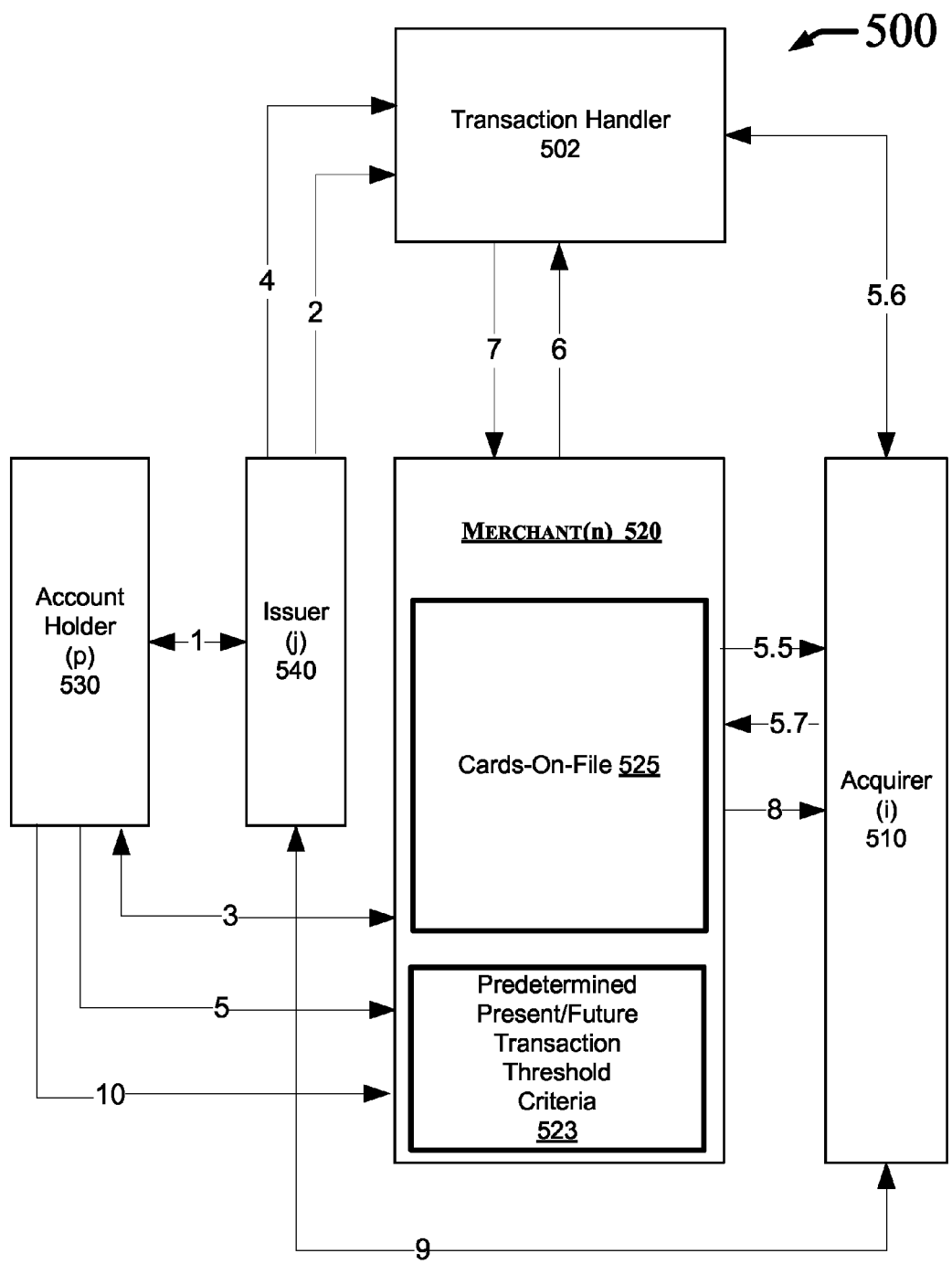

FIG. 4 illustrates, in accordance with the teachings of the present invention, a process 400 to provide the financial service of authorizing credit card transactions. FIG. 5 is a system 500 in which the depicted manipulative steps of process 400 in FIG. 4 can be operational.

Referring now to FIG. 4, process 400 begins with a step 410 at which a merchant receives a request for a present and/or a future credit transaction from an account holder. For this account holder, the merchant has stored information about the account holder's account in a database. The database also keeps other information about permissible transactions as represented by step 420. At step 420, the merchant determines that the credit transaction requested by the account holder exceeds a predetermined threshold.

In order to avoid losing the sale to the account holder, if possible, the merchant attempts to learn more about the account of the account holder than is stored in the accounts-on-file, and more than can be obtained from the merchant's acquirer. Rather than communicating with the merchant's acquirer, process 400 moves from step 420 to step 430 at which the merchant accesses information for the account of the account holder, in real time, that is kept by the financial service provider. The information obtained in real time from the financial service provider is sufficient to allow the merchant to make the decision to authorize the extension of credit upon the account of the account holder. Examples of the types of real time information that will allow the merchant to decide to extend credit after the merchant receives a denial to authorize as the same as those provided above. The merchant can be provided with such real time access automatically upon such denial of the authorization to extend credit such that the merchant's computing systems makes an automatic, secure, and privacy complying real time access to the financial service provider's computing systems, for instance the merchant's server being provided with real time access to the transaction handler's server. This real time access provides the merchant with recent information about the account holder's account, where that recent information may not have been available from the acquirer, such as where the recent information had only recently been obtained by the transaction handler or financial services provider from the issuer regarding recent changes to the account holder's account.

Alternatively, the merchant can be provided with such real time access upon such denial of authorization through an interactive user interface. The merchant operates the user interface, such as through a browser based input/output screen for the World Wide Web, to make an authenticated, access controlled, secure, and privacy compliant real time access to the financial service provider's computing systems, for instance the merchant's client being provided with real time access to the transaction handler's server. The information obtained in real time on the World Wide Web from the financial service provider will preferably be sufficient to allow the merchant to make the decision to authorize the extension of credit upon the account of the account holder. The merchant can be provided with such real time access automatically upon such denial of the authorization to extend credit. This real time access provides the merchant with recent information about the account holder's account, where that recent information may not have been available from the acquirer, such as where the recent information had only recently been obtained by the transaction handler or financial services provider from the issuer regarding recent changes to the account holder's account.

Referring again to FIG. 4, process 400 moves from step 430 to step 440 at which the merchant uses the data obtained in real time from the financial service provider to update the information kept by the merchant for the account of the account holder in the cards-on-file. Following step 440, the merchant extends credit for the transaction to the account holder at step 450 on the basis of the new information retrieved via the real time access to the financial service provider.

FIG. 5 illustrates a system 500 in which process 400 can be operational. System 500 includes a transaction handler 502 coordinating credit accounts with each issuer (j) 540 that issues each credit account to an account holder (p) 530. Each merchant (n) 520 can accept the credit card of the account holder (p) 530 for the purchase and sales of goods and services in a credit transaction using the account of the account holder (p) 530. Each merchant (n) 520 can also store account information about the credit cards of the cardholders 530 in a cards-on-file storage 525. For the purchase and sales of goods and services in a credit transaction using the account of the account holder (p) 530, merchant (n) 520 initiates an authorization of same with the merchant's acquirer (i) 510 who engages in a related communication with the issuer (j) 540 of the account of the account holder (p) 530. Upon authorization of the credit transaction, the merchant (n) 520 completes the purchase and sales of goods and services with account holder (p) 540.

System 500 represents a plurality of accounts held by account holders (p) 530 in which each issuer (j) 540 issues respective accounts to the account holders (p) 530. Merchants (n) 520 receive requests to extend credit upon account for transactions by the account holders (p) 530. Each acquirer (i) 510 receives from the merchant (n) 520 a request for authorization of the transaction for credit. This request may be granted or denied after the acquirer (i) 510 communicates with the corresponding issuer (i) 540. The transaction handler 502 coordinates each account for each account holder (p) 520 with the issuers 540 and the acquirers 510. The transaction handler 502 periodically receives updated account information from each respective issuer (j) 540 regarding its account holders (p) 530.

System 500 illustrates work flows 1 through 9. Work flow 1 represents the issuance of a credit account to an account holder (p) 530 by an issuer (j) 540. Work flow 2 represents the communication of information about the issued account to the transaction handler 502. In response to a request by a merchant (n) 520 for updated information from an account holder (p) 530, at work flow 3, the account holder (p) 530 provides information to the merchant (n) 520 for storage in a cards-on-file 525 incident to a request for a credit transaction for the purchase and sales of goods and services.

Work flow 4 represents a communication from the issuer (j) 540 to the transaction handler 502 that something has changed on the account of the account holder (p) 530. Note, however, that this change is not communicated to the merchant (n) 520 for storage in the cards-on-file 525. Subsequently, account holder (p) 530 requests a credit transaction with the merchant (n) 520 as shown by work flow 5. The merchant (n) 520 subjects the request for credit from the account holder (p) 530 to scrutiny via a predetermined present/future transaction threshold criteria 523. Here, the criteria dictates that one or more thresholds have been exceeded, thus necessitating merchant (n) 520 to initiate work flow 6.

Work flow 6 illustrates the merchant (n) 520 making a demand real time access to the transaction handler 502 to learn information about the account of account holder (p) 330 and thereby determine whether credit should rightfully be extended. Work flow 7 represents the communication back to the merchant (n) 520 of the needed information given by issuer (j) 540 at work flow 2 or 4 to the transaction handler 502.

Upon seeing the new information gained through real time access, merchant (n) 520 completes the financial transaction with account holder (p) 530 at work flow 10 following communication of same as shown by work flows 8 and 9 with the corresponding issuer (p) 530 and the merchant (n) 520's acquirer (i) 510. Accordingly, the real time information learned by the merchant (n) 520 allowed the extension of credit to the account of the account holder (p) 530, improved upon account holder service, and resulted in sales for the merchant (n) 520 that may have otherwise been lost.

Each merchant (n) 520 can request the execution of a batch process that determines changes that have been made to accounts kept in cards-on-file 525. In another implementation, work flows 5.5, 5.6, and 5.7 can be seen to represent a batch process initiated by the merchant (n) 520 at work flow 5.5 to make a request to the merchant's acquirer (i) 510 to determine changes to the cards-on-file 525. The merchant's acquirer (i) 510 passes the request at work flow 5.6 in one direction to the transaction handler 502. Using changes to the accounts received from the issuers 530, the accounts in the cards-on-file 525 are matched up against information about the accounts kept by the transaction handler 502 and sent back to the merchant (n) 520 at work flows 5.6 and 5.7 through its acquirer (i) 510. Note, however, that the batch process to update the cards-on-file database 525 need not be enabled as this is an optional feature left to the entity that assembles or otherwise integrates the various components of system 500.

Figure 6:
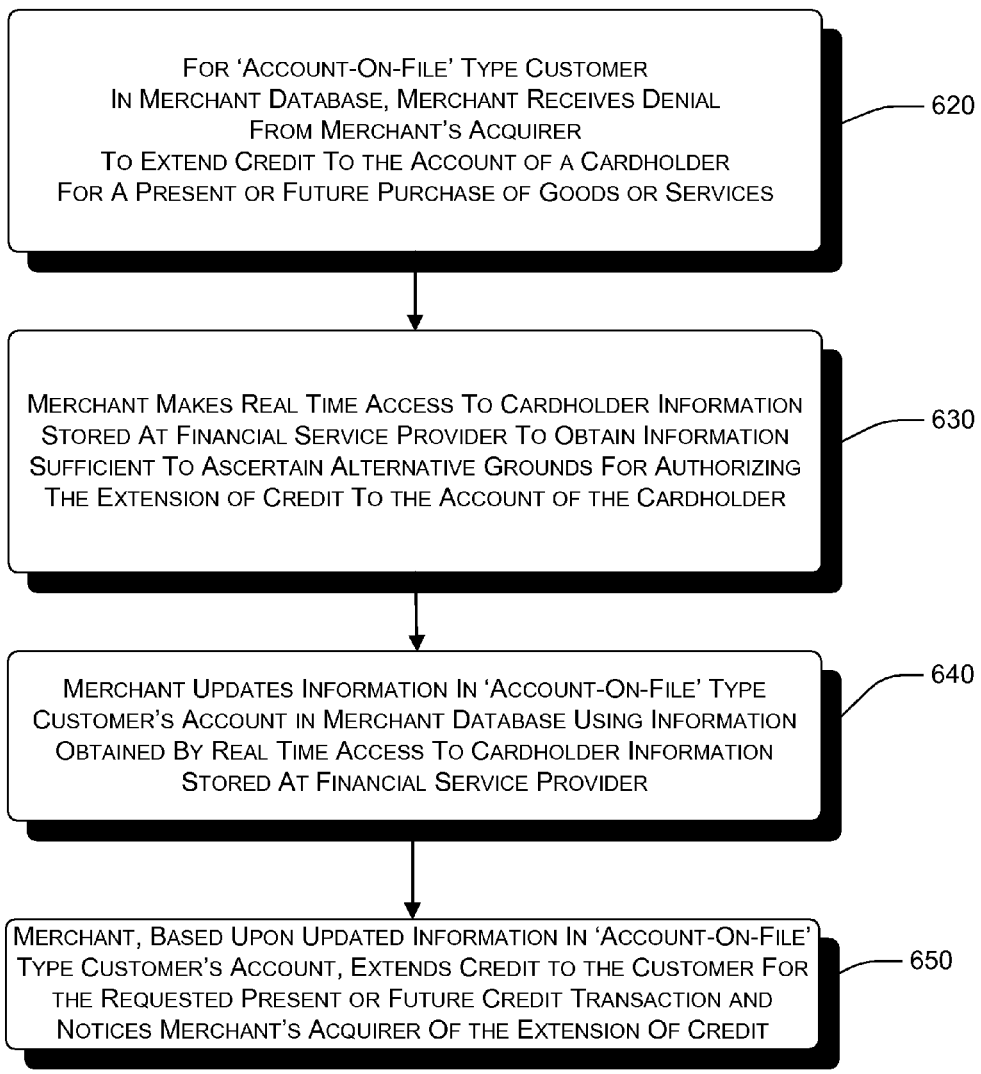
FIGS. 6-7 illustrate in related exemplary process and system diagrams, respectively, yet another implementation to provide the financial service of authorizing electronic payment vehicle transactions (i.e.; credit card transactions).
Figure 7:
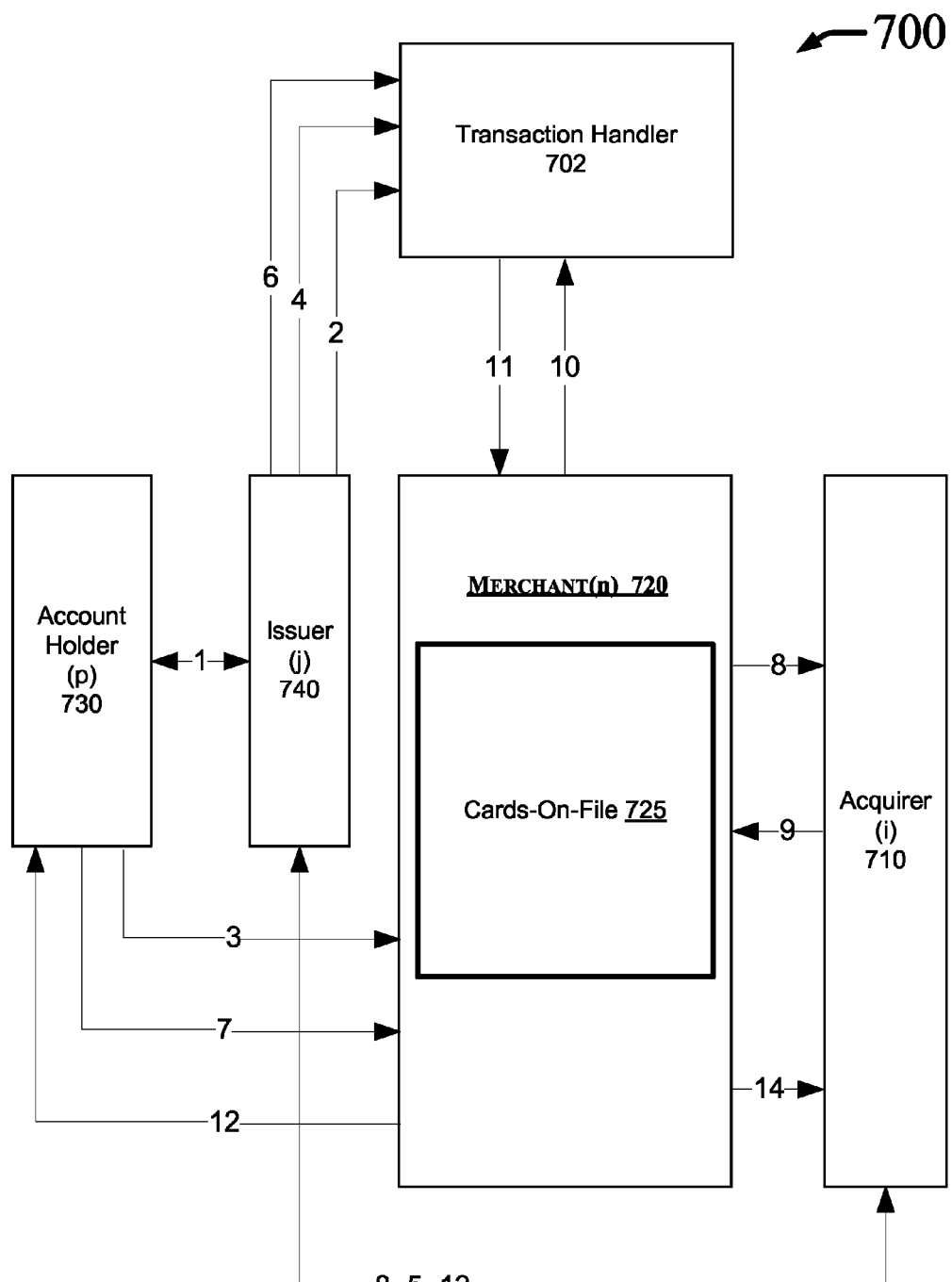

FIG. 6 illustrates, in accordance with the teachings of the present invention, a process 600 to provide the financial service of authorizing credit card transactions. FIG. 7 is a system 700 in which the depicted manipulative steps of process 600 in FIG. 6 can be operational.

Process 600 begins at step 620 at which a merchant investigates the possibility of extending credit to an account holder's account for a present or future financial transaction, where the account holder's account information is kept by the merchant. The merchant receives a denial of authorization to extend the credit to the account holder's account that the merchant is investigating. The denial of authorization or decline was received from the merchant's acquirer, albeit indirectly (the authorization or decline may come from the issuer).

Process 600 moves from step 620 to step 630 at which the merchant accesses information for the account of the account holder, in real time, that is kept by the financial service provider. The information obtained in real time from the financial service provider is sufficient to allow the merchant to make the decision to authorize the extension of credit upon the account of the account holder. The merchant can be provided with such real time access automatically upon such denial of the authorization to extend credit such that the merchant's computing systems makes an automatic, secure, and privacy complying real time access to the financial service provider's computing systems, for instance the merchant's server being provided with real time access to the transaction handler's server. This real time access provides the merchant with recent information about the account holder's account, where that recent information may not have been available from the acquirer, such as where the recent information had only recently been obtained by the transaction handler or financial services provider from the issuer regarding recent changes to the account holder's account Alternatively, the merchant can be provided with such real time access upon such denial of authorization through an interactive user interface. The merchant operates the user interface, such as through a browser based input/output screen for the World Wide Web, to make an authenticated, access controlled, secure, and privacy compliant real time access to the financial service provider's computing systems, for instance the merchant's client being provided with real time access to the transaction handler's server. The information obtained in real time on the World Wide Web from the financial service provider will preferably be sufficient to allow the merchant to make the decision to authorize the extension of credit upon the account of the account holder. The merchant can be provided with such real time access automatically upon such denial of the authorization to extend credit. This real time access provides the merchant with recent information about the account holder's account, where that recent information may not have been available from the acquirer, such as where the recent information had only recently been obtained by the transaction handler or financial services provider from the issuer regarding recent changes to the account holder's account Process 600 moves from step 640 to step 650 at which the merchant uses the data obtained in real time from the financial service provider to update the information kept by the merchant for the account of the account holder. Note that steps 640 and 650 can be in opposite order of execution.

FIG. 7 illustrates a system 700 in which process 600 can be operational. System 700 includes a transaction handler 702 coordinating credit accounts with each issuer (j) 740 that issues each credit account to an account holder (p) 730. Each merchant (n) 720 can accept the credit card of the account holder (p) 730 for the purchase and sales of goods and services in a credit transaction using the account of the account holder (p) 730. Each merchant (n) 720 can also store account information about the credit cards of the cardholders 730 in a cards-on-file storage 725. For the purchase and sales of goods and services in a credit transaction using the account of the account holder (p) 730, merchant (n) 720 initiates an authorization of same with the merchant's acquirer (i) 710 who engages in a related communication with the issuer (j) 740 of the account of the account holder (p) 730. Upon authorization of the credit transaction, the merchant (n) 720 completes the purchase and sales of goods and services with account holder (p) 740.

Each merchant (n) 720 can optionally request the execution of a batch process that determines changes that have been made to accounts kept in cards-on-file 725. The optional batch process will preferably be initiated by the merchant (n) 720 to make a request to the merchant's acquirer (i) 710 to determine changes to the cards-on-file 725. The merchant's acquirer (i) 710 passes the request to the transaction handler 702. Using changes to the accounts received from the issuers 730, the accounts in the cards-on-file 725 are matched up against information about the accounts kept by the transaction handler 702 and sent back to the merchant (n) 720 through its acquirer (i) 710. The optionally requested batch update process for cards-on-file 725 is an implementation having optional features that are left to the entity that assembles or otherwise integrates the various components of system 700.

System 700 represents a plurality of accounts held by account holders (p) 730 in which each issuer (j) 740 issues respective accounts to the account holders (p) 730. Merchants (n) 720 receive requests to extend credit upon account for transactions by the account holders (p) 730. Each acquirer (i) 710 receives from the merchant (n) 720 a request for authorization of the transaction for credit. This request may be granted or denied after the acquirer (i) 710 communicates with the corresponding issuer (i) 740. The transaction handler 702 coordinates each account for each account holder (p) 720 with the issuers 740 and the acquirers 710. The transaction handler 702 periodically received updated account information from each respective issuer (j) 740 regarding its account holders (p) 730.

System 700 illustrates work flows 1 through 14. Work flow 1 represent the issuance of a credit account to an account holder (p) 730 by an issuer (j) 740. Work flow 2 represents the communication of information about that cardholder's issued account to the transaction handler 702. At work flow 3, the account holder (p) 730 provides information to a merchant (n) 720 for storage in a cards-on-file 725 incident to a request for a credit transaction for the purchase and sales of goods and services.

Work flows 4 and 6 each represent a separate communication from the issuer (j) 740 to the transaction handler 702 that something has changed on the account of the account holder (p) 730. Neither of these changes are communicated to the merchant (n) 720 for storage in the cards-on-file 725. Subsequently, account holder (p) 730 requests a credit transaction with the merchant (n) 720 as shown by work flow 7. The request is followed by work flows 8 through 9 for the authorization to extend credit on the account of account holder (p) 730. Due to the discrepancy in the information changed at work flows 4 and 6 with the information about the account holder (p) 730 that is stored in and communicated from cards-on-file 725 by merchant (n) 720, merchant (n) 720 learns that the request for the authorization to extend credit is denied at work flow 9.

In response, work flow 10 illustrates the merchant (n) 720 making a demand real time access to the transaction handler 702 to learn the source of the discrepancy in the account information. Work flow 11 represent the communication back to the merchant (n) 720 of the needed information given by issuer (j) 740 at work flows 4 and 6 to the transaction handler 702.

Upon seeing the discrepancy, merchant (n) 720 can decide that it is financially prudent to complete the requested credit transaction with account holder (p) 730 at work flow 12 and communicates same as shown by work flows 13-14 with the corresponding issuer (p) 730 and with the merchant (n) 720's acquirer (i) 710. Accordingly, the real time information learned by the merchant (n) 720 at work flow 11 allowed the extension of credit to the account of the account holder (p) 730, improved upon account holder service, and resulted in increased sales for the merchant (n) 720 that would have otherwise been lost.

It should be understood that the present invention can be implemented in the form of control logic, in a modular or integrated manner, using software, hardware or a combination of both. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. In a system with a transaction handler coordinating accounts issued by issuers to corresponding respective account holders each making a requests for an authorization of a transaction on a corresponding said account to a corresponding merchant, the corresponding merchant having an acquirer with whom the transaction handler also coordinates the corresponding said accounts, a computer implemented method comprising:
    electronically forming, at a merchant processor, a first transmission destined for the acquirer of the one said merchant including a request for an authorization of a transaction against one said account for a corresponding said account holder;
    electronically receiving, at the merchant processor, a second transmission from the acquirer of the one said merchant including a denial of the request for the authorization of the transaction for the one said account in response to the request for the authorization of the transaction for the one said account;
    in response to the received denial, electronically forming a third transmission, at the merchant processor, destined for the transaction handler and including a request of the merchant for information about the one said account;
    electronically receiving, at the merchant processor, a fourth transmission from the transaction handler including the requested information about the one said account; and
    as an automatic response to the electronically receiving the requested information and without querying the corresponding said account holder, electronically comparing, at the merchant processor, the received requested information with a predetermined criterion to determine whether to complete the transaction against the one said account of the corresponding said account holder.

2. The computer implemented method as defined in claim 1, further comprising electronically providing, at the merchant processor, an interactive user interface to contain data corresponding to:
    the request for information about the one said account for which the denial was received; and
    the requested information about the one said account for which the denial was received.

3. The computer implemented method as defined in claim 1, wherein the electronically forming the first transmission, the electronically receiving the second transmission, the electronically forming the third transmission, the electronically receiving the fourth transmission, and the electronically querying the received request occur sequentially, each in real-time.

4. The computer implemented method as defined in claim 3, wherein the electronically forming the first transmission and the electronically receiving the second transmission occur using, at the merchant processor, a browser application for a network of servers.

5. The computer implemented method as defined in claim 1, further comprising, after the receiving of the fourth transmission, electronically storing, in a database of the merchant processor, the requested information in association with data about the one said account.

6. The computer implemented method as defined in claim 1, further comprising, after the transaction against the one said account is complete, electronically forming, at the merchant processor, a fifth transmission destined for the acquirer of the one said merchant including a request to clear and settle the transaction against the one said account.

7. The computer implemented method as defined in claim 1, wherein the received requested information includes data that is selected from the group consisting of:
    an address information change;
    an expiration date information change;
    a name information change for the account holder of the one said account; and
    an account number information change of the one said account.

8. The computer implemented method as defined in claim 1, further comprising, prior to said forming of the first transmission, electronically reading, using the merchant processor, an account identifier from a card of the one said account, wherein:
    the first transmission further includes the account identifier read at the card reader; and the transaction against the one said account is an extemporaneous card present transaction.

9. The computer implemented method as defined in claim 1, further comprising:
prior to said electronically forming of the first transmission, electronically receiving, at the merchant processor from the transaction handler, a fifth transmission including data about the one said account; and
electronically storing, within a database of the merchant processor, the received data from the transaction handler, wherein:
the data about the one said account becomes outdated at the time of the electronically forming of the first transmission; and
the first transmission includes at least a portion of the outdated data about the one said account.

10. The computer implemented method as defined in claim 1, wherein electronically forming the third transmission is an automated response to the said received reply.

11. In a system that includes a transaction handler processing a plurality of authorization requests for corresponding transactions each characterized by a merchant and an account holder engaging in the transaction upon an account that an issuer has issued to the account holder and the transaction handler receives updated account information from the issuers about the account, a computer implemented method comprising:
electronically receiving, in batch mode at a merchant processor from the transaction handler, a first transmission including data about a plurality of said accounts;
electronically storing, within a database of the merchant processor, the received data from the transaction handler;
electronically forming in real time, at the merchant processor, a second transmission including an authorization request requesting a corresponding said issuer of a one said account to authorize one said transaction between the one said merchant and a corresponding said account holder of the one said account, wherein the authorization includes at least some of the data about the one said account received in the first transmission;
electronically receiving in real time, at the merchant processor from the acquirer, a reply to the authorization request including a denial of the corresponding said issuer to authorize the one said transaction;
as an automatic response to said received reply, electronically forming, at the merchant processor, a third transmission destined for the transaction handler and including a request for the updated information about the one said account;
electronically receiving, at the merchant processor, a fourth transmission from the transaction handler including the requested updated information about the one said account;
as an automatic response to the electronically receiving the requested updated information and without querying the corresponding said account holder, electronically comparing, at the merchant processor, the received updated information against a predetermined criterion to find a match; and
when a match is found, electronically completing, at the merchant processor, the transaction against the one said account of the corresponding said account holder.

12. The computer implemented method as defined in claim 11, wherein:
each said account holder comprises a cardholder;
the transaction handler comprises a financial service provider; and
each said request for authorization upon each said account for each said transaction of a corresponding said account holder comprises a request to extend credit upon the account of the corresponding said cardholder.

13. The computer implemented method as defined in claim 11, further comprising electronically providing, at the merchant processor, an interactive user interface to contain data corresponding to:
the request for the updated information about the one said account for which the denial was received; and
the updated information about the one said account for which the denial was received.

14. The computer implemented method as defined in claim 11, wherein the electronically forming the third transmission and the electronically receiving the fourth transmission occur using a browser application for a network of servers.

15. The computer implemented method as defined in claim 11, further comprising, after the transaction against the one said account is complete, electronically forming, at the merchant processor, a fifth transmission destined for the acquirer of the one said merchant including a request to clear and settle the transaction against the one said account.

16. The computer implemented method as defined in claim 11, wherein the updated information is selected from the group consisting of:
an address information change;
an expiration date information change;
a name information change for the account holder of the one said account; and
an account number information change of the one said account.

17. A merchant server including a processor communicatively connected to a transaction handler and a computer readable medium storing computer readable code that, when executed in real time by the processor, causes the merchant server to perform a method comprising:
electronically forming a first transmission requesting an authorization of a transaction between a merchant and an account holder against an account of the account holder, wherein the first transmission:
is destined for the issuer of the account; and
includes outdated account information about the account;
electronically receiving a second transmission, responsive to the request for authorization, including a denial of the issuer to authorize the transaction upon the account;
in response to the received denial, electronically forming a third transmission destined for a transaction handler corresponding to the account and including a request for updated information about the account;
electronically receiving a fourth transmission from the transaction handler including the updated information about the account;
as an automatic response to the electronically receiving the requested information and without querying the corresponding said account holder, electronically comparing the received updated information with a predetermined criterion to find a match; and
when a match is found, electronically completing the transaction against the account of the corresponding said account holder.

18. The merchant server as defined in claim 17, wherein:
the merchant server further includes a card reader;
the computer readable medium further stores computer readable code that, when executed in real time by the processor, causes the merchant server to perform the method further comprising, prior to said forming of the first transmission, electronically reading, at the card reader, the outdated account information from a card of the account; and the first transmission further includes the account identifier read at the card reader.

19. The merchant server as defined in claim 17, wherein the merchant server further includes a database;

the computer readable medium further stores computer readable code that, when executed in real time by the processor, causes the merchant server to perform the method further comprising:

prior to said real time electronically forming of the first transmission, electronically receiving, from the transaction handler, a fifth transmission including data about the account; and electronically storing within the database the received data from the transaction handler;

and the data about the account becomes the outdated account information at a time when the first transmission is electronically formed.

20. The merchant server as defined in claim 17, wherein:

the computer readable medium further stores computer readable code that, when executed in real time by the processor, causes the merchant server to perform the method further comprising, after said match is found, electronically forming a fifth transmission including a request to clear and settle the transaction against the account; and the fifth transmission is destined for an acquirer of the merchant.

\* \* \* \* \*

UNITED STATES PATENT AND TRADEMARK OFFICE
CERTIFICATE OF CORRECTION

| | | |
|---|---|---|
| PATENT NO. | : 7,966,257 B2 | |
| APPLICATION NO. | : 12/267117 | |
| DATED | : June 21, 2011 | |
| INVENTOR(S) | : Laura DiGioacchino | |

It is certified that error appears in the above-identified patent and that said Letters Patent is hereby corrected as shown below:

In claim 1, column 15, line 55, please replace "requests" with --request--.

In claim 11, column 17, lines 26-27, please replace "issuers" with --issuer--.

Signed and Sealed this
Twenty-third Day of August, 2011

David J. Kappos
*Director of the United States Patent and Trademark Office*